United States Patent [19]
Shiraishi

[11] Patent Number: 4,879,677
[45] Date of Patent: Nov. 7, 1989

[54] PARALLEL ADDER CIRCUIT WITH SIGN BIT DECODER FOR MULTIPLIER

[75] Inventor: Mikio Shiraishi, Yokohama, Japan

[73] Assignee: Kabushiki Kaisha Toshiba, Kawasaki, Japan

[21] Appl. No.: 171,105

[22] Filed: Mar. 21, 1988

[30] Foreign Application Priority Data

Mar. 30, 1987 [JP] Japan .................................. 62-76647

[51] Int. Cl.$^4$ .............................................. G06F 7/52
[52] U.S. Cl. .................................................. 364/760
[58] Field of Search ...................... 364/736.5, 754, 759, 364/760

[56] References Cited

U.S. PATENT DOCUMENTS

| | | | |
|---|---|---|---|
| 4,575,812 | 3/1986 | Kloker et al. | 364/760 |
| 4,748,582 | 5/1988 | New et al. | 364/754 |
| 4,748,584 | 5/1988 | Noda | 364/760 |

OTHER PUBLICATIONS

Waser et al., "Real Time Processing Gains Ground with Fast Digital Multiplier", *Electronics*, Sep. 29, 1977, pp. 93–99.

*Primary Examiner*—Gary V. Harkcom
*Assistant Examiner*—Dale M. Shaw
*Attorney, Agent, or Firm*—Finnegan, Henderson, Farabow, Garrett and Dunner

[57] ABSTRACT

A parallel adder circuit includes a partial product adding circuit for adding one-bit partial products together in order total to a plurality of partial products, and sign bit decoder circuit for decoding sign bits of a given bit number to provide a total sum of the sign bits, and supply this total sum to the partial product adding circuit at given bits. In a multiplier utilizing Booth's algorithm, a decoder circuit is used for decoding sign bits of the partial product to provide the total sum of all the sign bits, and a decoded output is supplied to the partial product adding circuit. Therefore, the number of higher bit inputs can be reduced and the number of full adders in the partial product adding circuit can be decreased.

15 Claims, 9 Drawing Sheets

```
                    a7 a6 a5 a4 a3 a2 a1 a0     --- MULTIPLICAND
                  x) b7 b6 b5 b4 b3 b2 b1 b0     --- MULTIPLIER
                     p80 p70 p60 p50 p40 p30 p20 p10 p00  --- PARTIAL PRODUCT pp0
                  p81 p71 p61 p51 p41 p31 p21 p11 p01     --- PARTIAL PRODUCT pp1
         10      p82 p72 p62 p52 p42 p32 p22 p12 p02      --- PARTIAL PRODUCT pp2
          ╲  ┌─────────────────────┐
   p80 p80 p80 p80 p80│p80│p81 p71 p61 p51 p41 p31 p21 p11 p01
   p81 p81 p81│p82│p82 p72 p62 p52 p42 p32 p22 p12 p02
+) p83 p73 p63 p53 p43 p33 p23 p13 p03                    --- PARTIAL PRODUCT pp3
   d14 d13 d12 d11 d10 d9 d8 d7 d6 d5 d4 d3 d2 d1 d0      --- PRODUCT
```

FIG. 1   (PRIOR ART)

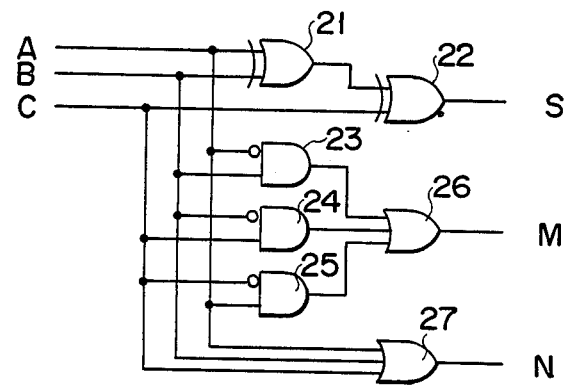
FIG. 5
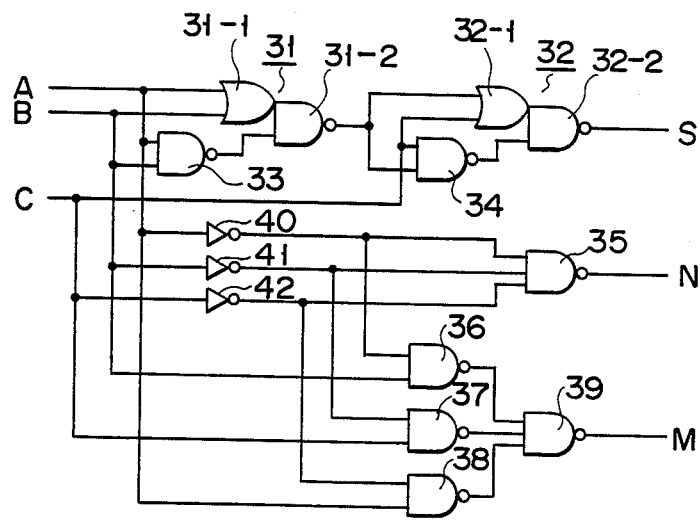
FIG. 6
FIG. 7

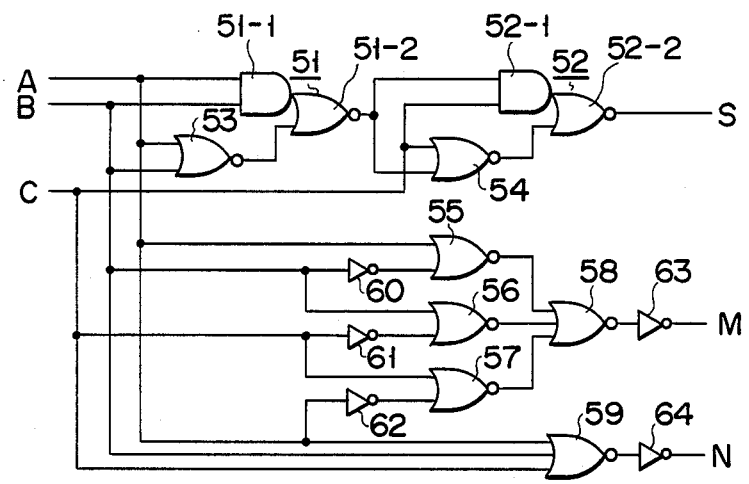
F I G. 8
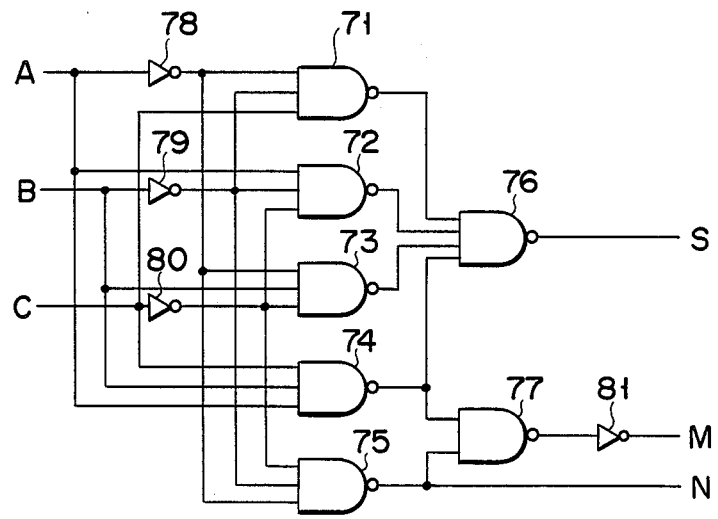
F I G. 9

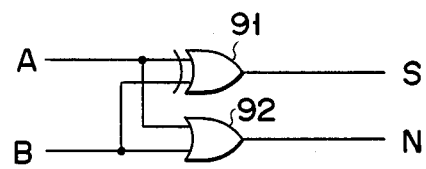
F I G. 10
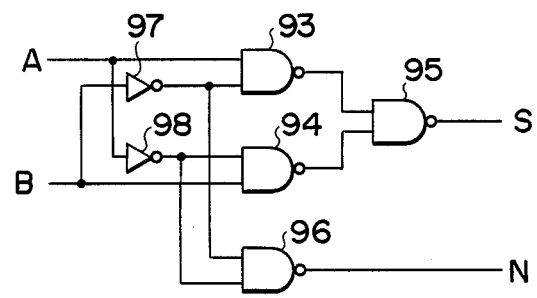
F I G. 11
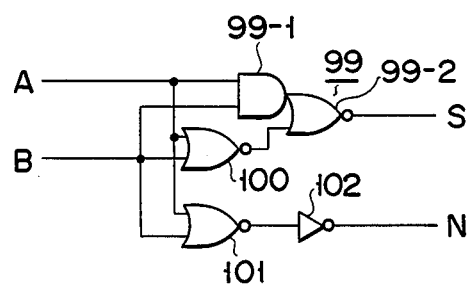
F I G. 12
F I G. 13

| INPUT | | | | OUTPUT | | |
|---|---|---|---|---|---|---|
| A | B | C | D | S | M | N |
| 0 | 0 | 0 | 0 | 0 | 0 | 0 |
| 0 | 0 | 0 | 1 | 1 | 1 | 1 |
| 0 | 0 | 1 | 0 | 1 | 1 | 1 |
| 0 | 0 | 1 | 1 | 0 | 1 | 1 |
| 0 | 1 | 0 | 0 | 1 | 1 | 1 |
| 0 | 1 | 0 | 1 | 0 | 1 | 1 |
| 0 | 1 | 1 | 0 | 0 | 1 | 1 |
| 0 | 1 | 1 | 1 | 1 | 0 | 1 |
| 1 | 0 | 0 | 0 | 1 | 1 | 1 |
| 1 | 0 | 0 | 1 | 0 | 1 | 1 |
| 1 | 0 | 1 | 0 | 0 | 1 | 1 |
| 1 | 0 | 1 | 1 | 1 | 0 | 1 |
| 1 | 1 | 0 | 0 | 0 | 1 | 1 |
| 1 | 1 | 0 | 1 | 1 | 0 | 1 |
| 1 | 1 | 1 | 0 | 1 | 0 | 1 |
| 1 | 1 | 1 | 1 | 0 | 0 | 1 |
F I G. 14
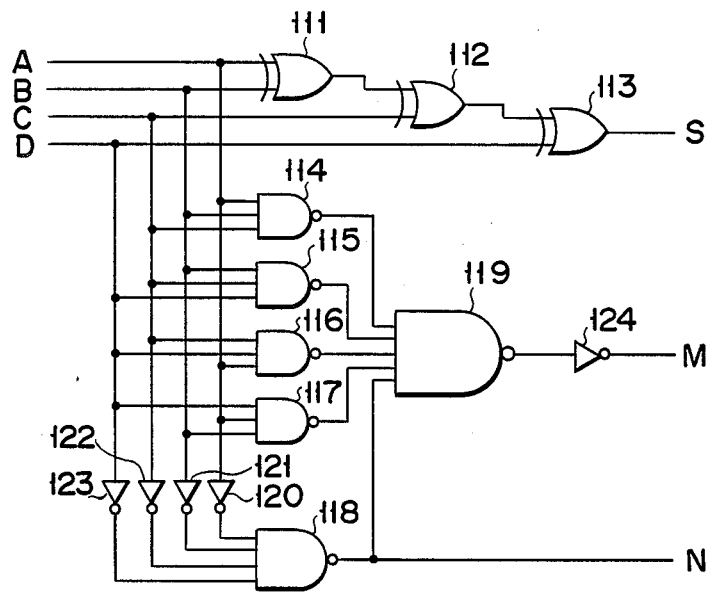
F I G. 15

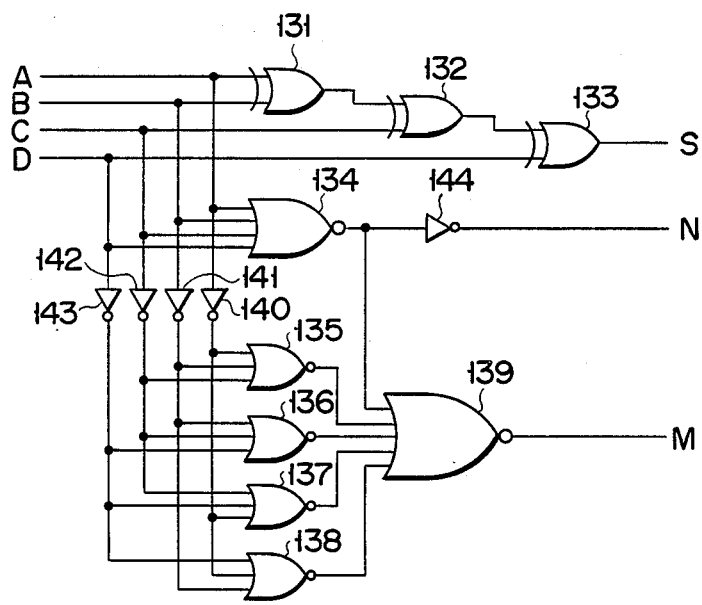
F I G. 16

PARALLEL ADDER CIRCUIT WITH SIGN BIT DECODER FOR MULTIPLIER

BACKGROUND OF THE INVENTION

1. Field of the Invention

This invention relates to a parallel adder circuit for adding signed binary numbers in parallel, and more particularly to a parallel adder circuit for use in multipliers.

2. Description of the Related Art

The multiplication of a binary number by a binary number is effected by first attaining partial products of the multiplicand and respective bits of the multiplier and then adding all the partial products thus obtained together. In the normal multiplication, the partial products equal in number to the bits of the multiplier are obtained, thus increasing the number of times for adding the partial products to lower the operation speed. Therefore, in the high speed multiplier, the Booth's algorithm as described below is used to decrease the number of partial products.

Assume that in the case of using the second order Booth's algorithm, multiplicand is set to $$A\ (=-2^{n-1} \cdot a_{n-1} + 2^{n-2} \cdot a_{n-2} + \ldots + 2a_1 + a_0)$$

and the multiplier is set to $$B\ (=-2^{n-1} \cdot b_{n-1} + 2^{n-2} \cdot b_{n-2} + \ldots + 2b_1 + b_0).$$

In this case, if n is an even number, then the product D of A and B can be obtained as follows:

$$\begin{aligned} D &= A \cdot B \\ &= A[-2^{n-1} \cdot b_{n-1} + 2^{n-2} \cdot b_{n-2} + \ldots + 2b_1 + b_0] \\ &= A\,[(b_0 - 2b_1) + (b_1 + b_2 - 2b_3) \cdot 2^2 + \ldots + \\ &\qquad (b_{n-3} + b_{n-2} - 2b_{n-1}) \cdot 2^{n-2}] \\ &= \sum_{i=0}^{n/2-1} ppi \cdot 2^{2i} \end{aligned} \tag{1}$$

where ppi is a partial product and $ppi = A(b_{2i-1} + b_{2i} - 2b_{2i+1})$.

The multiplication utilizing the Booth's algorithm has two features. One of the features is that the number of partial products to be added is reduced to one-half that of partial products in the case of the ordinary multiplication algorithm. The other feature is that partial product ppi is represented in terms of 2's complement, and the operation with a sign can be effected without particular correction.

FIG. 1 shows the process of a multiplication of 8 bits×8 bits using the Booth's algorithm. In this case, most significant bits a7 and b7 of multiplicand A and multiplier B and most significant bit d14 of the product D are sign bits. Four partial products pp0 to pp3 are obtained as partial product ppi. Further, in FIG. 1, numerals in the frame surrounded by broken lines 10 are extended sign bits.

With the Booth's algorithm, the operation accompanied by a sign can be effected without particular correction, but it is necessary to extend sign bits of the partial products as shown in FIG. 1. In a circuit such as carry save adder (CSA) which sequentially performs additions, the sign bits may be extended by two bits at one time. However, in an adding circuit such as the Wallace tree, since a large number of bits at the same digits of the partial products are simultaneously added together, it becomes necessary to extend more sign bits than in the case of CSA.

FIG. 2 is a circuit diagram showing part of the construction of the prior art multiplier for multiplication of 12 bits×12 bits using the Booth's algorithm. One-bit partial products $p_{i,j}$ (i, j=0, 1, 2, ---, 12) are selectively supplied to full adders (FA) 11. Sum outputs S and carry outputs C from full adders 11 are respectively supplied to half adders (HA) 12 and full adders 11. Sum outputs S and carry outputs C from latter full adders 11 are supplied to two-input high speed adder (HSA) 13 which is used to obtain products d0 to d22. In practice, Booth's decoder and selector are used to obtain one-bit partial products $p_{i,j}$, but they are not shown for brevity. Full-adders 11 and half adders 12 are connected to form the Wallace tree.

In the multiplier, six partial products pp0 to pp5 are added together by the Wallace tree to make two binary numbers which are then added together by two-input high speed adder 13 to provide products d0 to d22. Assume now that the number of partial products ppi to be added is six. Then, the number of addition stages which is called the depth of Wallace tree is 3. However, if partial product ppi is negative, it becomes necessary to add "1" to the least significant bit (LSB) of the output from the selector in order to represent the partial product in terms of 2's complement. Therefore, in the multiplier, the depth of Wallace tree is 4.

In the multiplier, the sign bits of the partial products are extended to the most significant bit (MSB) or 22nd bit and supplied to the Wallace tree. Therefore, those ones of full adders 11 which are hatched in FIG. 2 are connected to receive extended sign bits p12.0, p12.1 and p12.2. Thus, the full adders which receive only the sign bits are redundant, additionally necessitating a corresponding number of full adders and making the multiplier complicated in construction.

Further, a multiplier shown in FIG. 3 is known in the prior art. In the multiplier, the redundant full adders in the multiplier of FIG. 2 are omitted and a single full adder 14 connected to receive extended sign bits is provided. Thus, sum output S and carry output C of fully adder 14 can be extended towards upper bits.

In the multiplier, the fan out of fully adder 14 hatched in FIG. 3 and used to add sign bits p12.0, p12.1 and p12.2 is large. Therefore, the signal propagation delay time becomes large, making time for multiplication long. Further, since it is necessary to extend both the sum output and carry output, it is impossible to omit adders other than the redundant full adders shown in FIG. 2, making the circuit construction complicated.

SUMMARY OF THE INVENTION

An object of this invention is to provide a parallel adder circuit which is simple in construction.

According to one embodiment of this invention, there is provided a parallel adder circuit for performing multiplication of values represented in terms of 2's compliment using the Booth's agorithm, comprising partial product adding circuit for adding one-bit partial products together to add a plurality of partial products together, and sign bit decoder circuit for decoding sign bits of a given bit number to provide a total sum of the sign bits and supply the total sum of the sign bits to the partial product adding circuit at given bits.

With this construction, the decoding circuit is used to decode the sign bits of the partial products to provide a total sum of the sign bits, and the decoded output is supplied to the partial product adding circuit so that the number of inputs supplied to the upper bits can be reduced. Thus, the number of adders in the partial product adding circuit can be reduced, making parallel adder circuit simple in construction.

BRIEF DESCRIPTION OF THE DRAWINGS

FIG. 1 is a diagram showing the multiplication process using the Booth's algorithm;

FIG. 5 is a diagram showing a relation between the input and output of a sign bit decoder used in the circuit shown in FIG. 4;

FIGS. 6 to 9 are circuit diagrams showing the circuit construction of sign bit decoders satisfying the input-output relation shown in FIG. 5;

FIG. 10 is a diagram showing another relation between the input and output of the sign bit decoder in the circuit of FIG. 4;

FIGS. 11 to 13 are circuit diagrams showing the circuit construction of sign bit decoders satisfying the input-output relation shown in FIG. 10;

FIG. 14 is a diagram showing still another relation between the input and output of the sign bit decoder in the circuit of FIG. 4; and FIGS. 15 and 16 are circuit diagrams showing the circuit construction of sign bit decoders satisfying the input-output relation shown in FIG. 14.

DETAILED DESCRIPTION OF THE PREFERRED EMBODIMENTS

Figure 4:
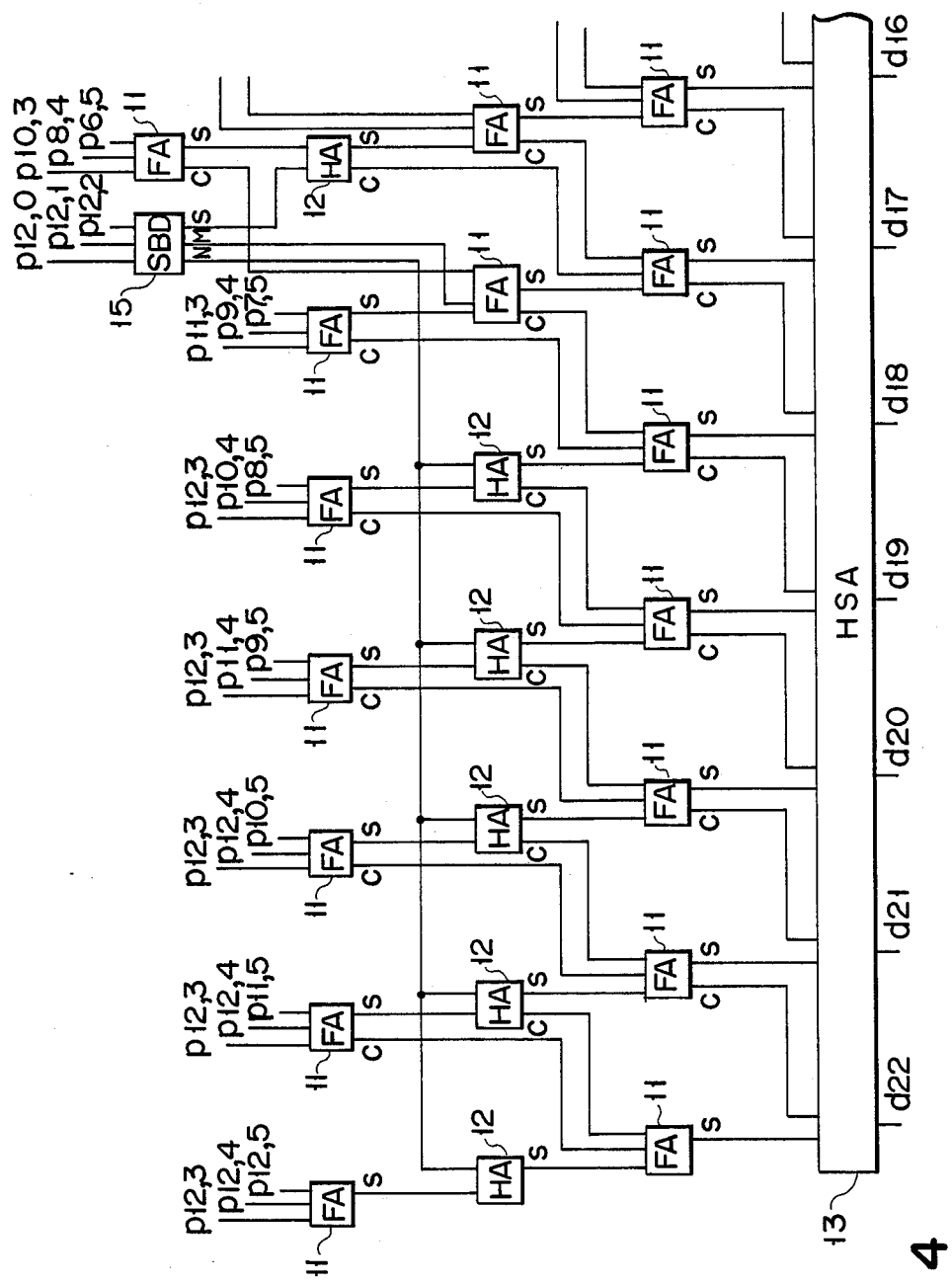
FIG. 4 is a circuit diagram showing the construction of part of a multiplier having a parallel adder circuit according to one embodiment of this invention.

FIG. 4 is a circuit diagram showing the construction of part of a multiplier which performs a multiplication of 12 bits × 12 bits using the Booth's algorithm, and in which a parallel adder circuit of this invention is used. In this circuit, one-bit partial products $p_{i,j}$ (i, j=0, 1, 2, - - - , 12) made by Booth's decoders and selectros (not shown) are selectively supplied to full adders (FA) 11. Sum outputs S and carry outputs C, supplied from full adders 11, are selectively supplied to half adders (HA) 12 and full adders 11. Sum outputs S and carry output C, supplied from latter full adders 11, are selectively supplied to two-input high speed adders (HSA) 13 which calculate products $d_0$ to $d_{22}$. In this case, full adders 11 and half adders 12 form the Wallace tree.

Figure 2:
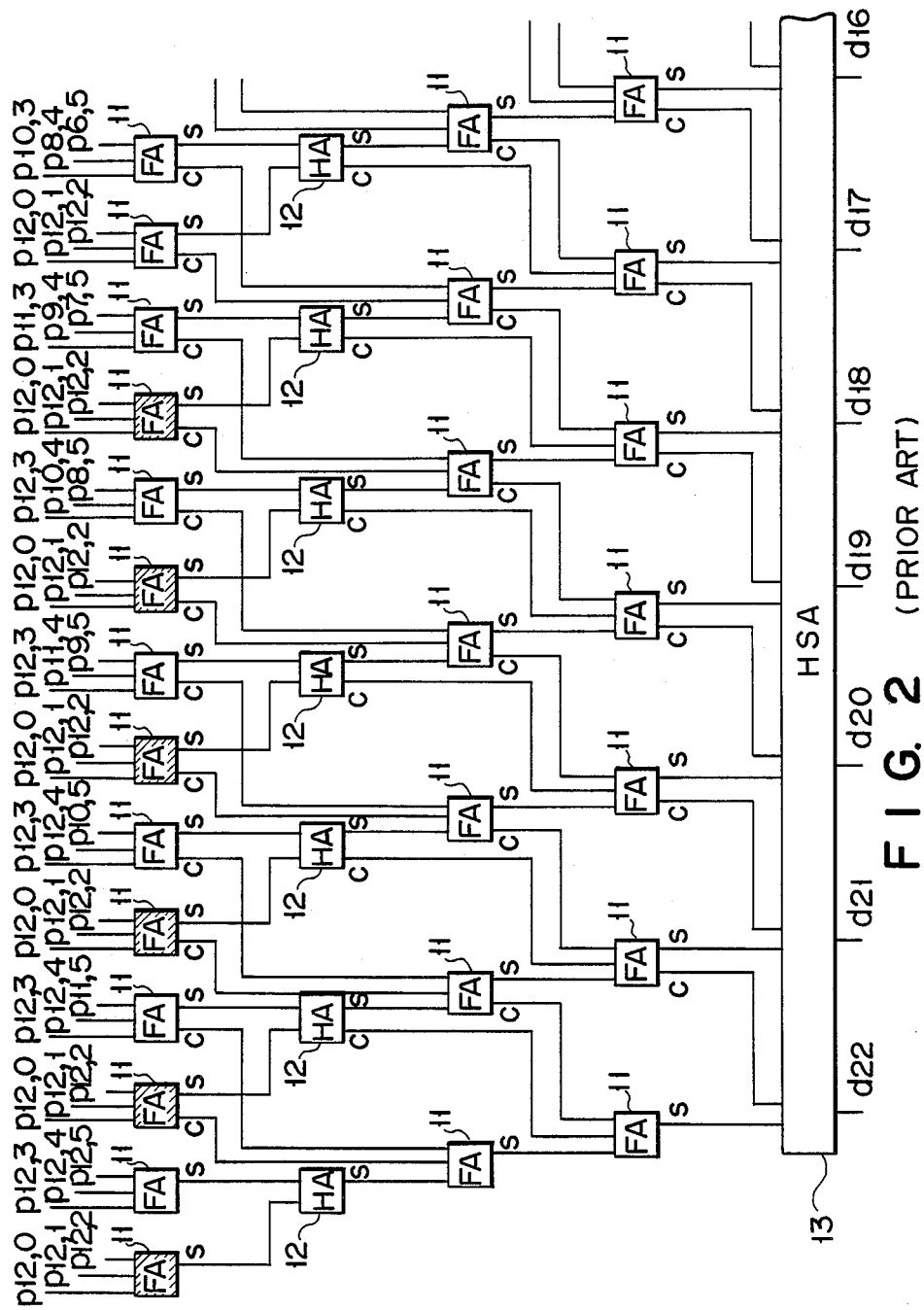
FIG. 2 is a circuit diagram showing the construction of part of the prior art multiplier utilizing the Booth's algorithm.
Figure 3:
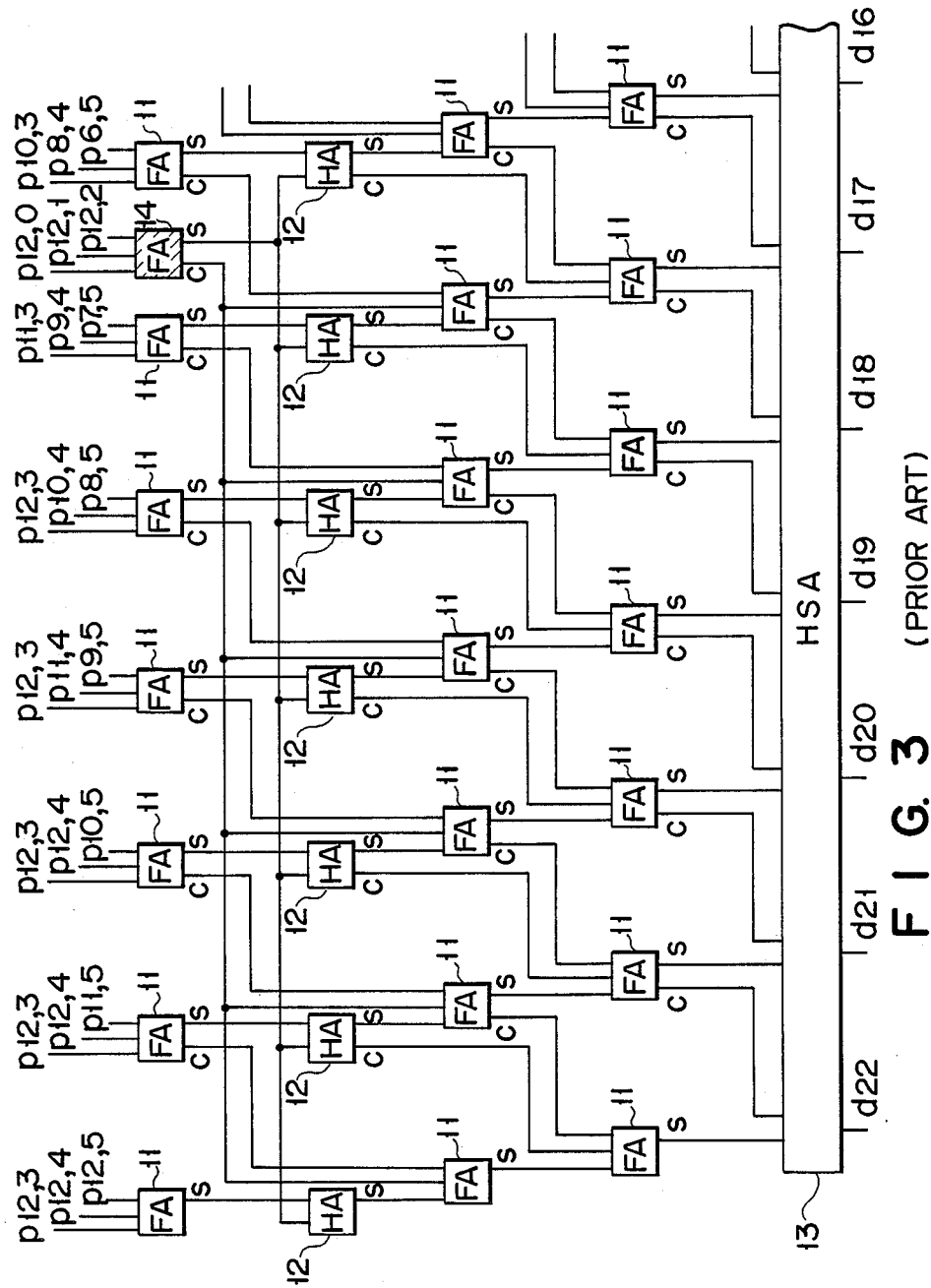
FIG. 3 is a circuit diagram showing the construction of part of another prior art multiplier.

In the multiplier of this embodiment, full adder 14 which is hatched and connected to receive sign bits p12.0, p12.1 and p12.2 as shown in FIG. 3, is omitted and instead sign bit decoder (SBD) 15 connected to receive sign bits p12.0, p12.1 and p12.2 is used. S, M and N outputs from decoder 15 are supplied to corresponding full adders 11 and half adders 12.

As is clearly seen from FIG. 1, the sign bits of the partial products and the extended portion thereof have the same value, i.e., "0" or "1" at each digit. Assuming that all the sign bits are regarded as numerals represented in terms of 2's complements, −1 is represented when all the bits are "1" and 0 is represented when all the bits are "0". Therefore, the total sum of three sign bits p12.0, p12.1 and p12.2 can be one of the following four values.

$$0 + 0 + 0 = 0 \qquad (2)$$

$$(-1) + 0 + 0 = (-1) \qquad (3)$$

$$(-1) + (-1) + 0 = (-2) \qquad (4)$$

$$(-1) + (-1) + (-1) = (-3) \qquad (5)$$

Thus, the total sum of the sign bits can be obtained by decoding bits at any one digit in the sign bit portion. Examples of the calculations used in adding 4-bit sign bit portions are shown in the following:

```
  0000      1111      1111      1111
  0000      0000      1111      1111
+ 0000    + 0000    + 0000    + 1111
  ----      ----      ----      ----
  0000      1111      1110      1101
          = (−1)    = (−2)    = (−3)
```

Since bits higher order than the second bit are all equal, the output of decoder 15 can be constituted by three bits and the input thereto may be LSB of each sign bit portion or one bit at any digit.

Assume now that three input bits are A, B and C and LSB, second bit and third bit of the output thereof are S, M and N. Then, it is only required that the following relation between these values be satisfied.

$$
\begin{aligned}
S &= A \oplus B \oplus C \\
  &= (A \times \overline{B} \times \overline{C}) + (\overline{A} \times B \times \overline{C}) \\
  &\quad + (\overline{A} \times \overline{B} \times C) + (A \times B \times C)
\end{aligned} \qquad (6)
$$

$$
\begin{aligned}
M &= (\overline{A} \times B) + (\overline{B} \times C) + (\overline{C} \times A) \\
  &= (A \times \overline{B}) + (B \times \overline{C}) + (C \times \overline{A}) \\
  &= (\overline{A \times B \times C}) \times (A + B + C)
\end{aligned} \qquad (7)
$$

$$N = A + B + C \qquad (8)$$

Symbol ⊕ in equation (6) indicates the exclusive logical sum.

FIG. 5 shows the input-output relations indicated by equations (6) to (8). That is, in the circuit of FIG. 4, sign bit decoder 15 which satisfies the input-output relation shown in FIG. 5 is used instead of full adder 14 which is hatched in FIG. 3. Since decoder 15 does not supply the sum of bits at only one digit, but rather, supplies the sum of bits at all the digits, one of outputs S, M and N of decoder 15 can be used for each digit, thereby making it possible to reduce the number of full adders or half adders in comparison with the circuit of FIG. 3. The circuit of the embodiment shown in FIG. 4 is reduced by five full adders and one-half adder in comparison with the circuit of FIG. 3.

FIGS. 6 to 9 are diagrams each showing the concrete construction of sign bit decoder 15 which is capable of satisfying the input-output relation of FIG. 5.

The decoder of FIG. 6 is formed of exclusive-OR gates 21 and 22, AND gates 23 to 25, each having an inverted input terminal, and OR gates 26 and 27. First and second input terminals of exclusive-OR gate 21 are respectively connected to receive sign bits A and B. First and second input terminals of exclusive-OR gate 22 are connected to respectively receive the output of exclusive-OR gate 21 and sign bit C. A first bit output S is derived from an output terminal of exclusive-OR gate 22. First and second input terminals of AND gate 23 are connected to respectively receive an inverted signal of sign bit A and sign bit B. First and second input terminals of AND gate 24 are connected to respectively receive an inverted signal of sign bit B and sign bit C. Further, first and second input terminals of AND gate 25 are connected to respectively receive an inverted signal of sign bit C and sign bit A. Output signals of AND gates 23 to 25 are supplied to OR gate 26, which in turn produces second bit output M. Three input terminals of OR gate 27 are connected to receive sign bits A, B and C, and produces third bit output N.

The decoder of FIG. 7 is constituted by OR-NAND type composite gates 31 and 32, NAND gates 33 to 39 and inverters 40 to 42. First and second input terminals of OR gate 31-1 are connected to respectively receive sign bits A and B. First and second input terminals of NAND gate 33 are connected to respectively receive sign bits A and B. Output signals of OR gate 31-1 and NAND gate 33 are supplied to NAND gate 31-2. In this example, NAND gate 31-2 and OR gate 31-1 constitute OR-NAND type composite gate 31. First and second input terminals of OR gate 32-1 are connected to respectively receive output of NAND gate 31-2 and sign bit C. First and second input terminals of NAND gate 34 are connected to respectively receive output of NAND gate 31-2 and sign bit C. Output signals of OR gate 32-1 and NAND gate 34 are supplied to NAND gate 32-2, which in turn produces first bit output S. In this example, NAND gate 32-2 and OR gate 32-1 constitute OR-NAND type composite gate 32. Inverters 40 to 42 are respectively connected to receive sign bits A, B and C. Three input terminals of NAND gate 35 are respectively connected to receive outputs of inverters 40 to 42, and NAND gate 35 produces third bit output N. First and second input terminals of NAND gate 36 are connected to respectively receive the output of inverter 40 and sign bit B. First and second input terminals of NAND gate 37 are connected to respectively receive output of inverter 41 and sign bit C. First and second input terminals of NAND gate 38 are connected to respectively receive output of inverter 42 and sign bit A. Three input terminals of NAND gate 39 are respectively connected to receive outputs of NAND gate 36 to 38, and NAND gate 39 produces second bit output M.

The decoder of FIG. 8 is constituted by AND-NOR gate type composite gates 51 and 52, NOR gates 53 to 59 and inverters 60 to 64. The circuit is basically the same as a circuit obtained by replacing the NAND gate and OR gates, in the circuit of FIG. 7, with NOR gates and AND gates. In the decoder of FIG. 8, first and second input terminals of AND gate 51-1 are connected to respectively receive sign bits A and B. First and second input terminals of NOR gate 53 are connected to respectively receive sign bits A and B. First and second input terminals of NOR gate 51-2 are connected to respectively receive outputs of AND gate 51-1 and NOR gate 53. NOR gate 51-2 and AND gate 51-1 constitute AND-NOR gate type composite gate 51. First and second input terminals of AND gate 52-1 are connected to respectively receive output of NOR gate 51-2 and sign bit C. First and second input terminals of NOR gate 54 are connected to respectively receive output of NOR gate 51-2 and sign bit C. NOR gate 52-2 is connected to receive outputs of AND gate 52-1 and NOR gate 54 and produces first bit output S. NOR gate 52-2 and AND gate 52-1 constitute AND-NOR gate type composite gate 52. Inverters 60 to 62 are connected to respectively receive sign bits B, C and A. First and second input terminals of NOR gate 55 are connected to respectively receive sign bit A and output of inverter 60. First and second input terminals of NOR gate 56 are connected to respectively receive sign bit B and output of inverter 61. First and second input terminals of NOR gate 57 are connected to respectively receive sign bit C and the output of inverter 62. Three input terminals of NOR gate 58 are connected to receive outputs of NOR gates 55 to 57 and an output of NOR gate 58 is supplied to inverter 63, which in turn produces second bit output M. Three input terminals of NOR gate 59 are connected to receive sign bits A, B and C, and NOR gate 59 supplies an output to inverter 64, which in turn produces third bit output N.

The decoder of FIG. 9 is constituted by NAND gates 71 to 77 and inverters 78 to 81. Inverters 78 to 80 are connected to receive sign bits A, B and C. First, second and third input terminals of NAND gate 71 are connected to respectively receive the output of inverter 78, output of inverter 79 and sign bit C. First, second an third input terminals of NAND gate 72 are connected to respectively receive sign bit A and the outputs of inverters 79 and 80. First, second and third input terminals of NAND gate 73 are connected respectively to receive output of inverter 78, sign bit B and output of inverter 80. First to third input terminals of NAND gate 74 are connected to receive sign bits C, B and A. First to third input terminals of NAND gate 75 are connected to receive outputs of inverters 80, 79 and 78. First to fourth input terminals of NAND gate 76 are connected to receive outputs of NAND gates 71 to 74, and NAND gate 76 produces first bit output S. First and second input terminals of NAND gate 77 are connected to respectively receive the outputs of NAND gates 74 and 75, and an output of NAND gate 77 is supplied to inverter 81, which in turn produces second bit output M. Further, an output of NAND gate 75 is produced as third bit output N.

In the embodiment described above, Fan-out for output N of decoder 15 is 5, and is large in comparison with those for outputs S and M, increasing the signal propagation delay time. However, output N is derived as a logical sum signal of inputs A, B and C. Since a circuit for deriving a logical sum can be operated at a high speed in comparison with a full adder, the influence give on time for multiplication by increase in the signal propagation delay time due to increase in the fan-out can be made smaller than in the circuit of FIG. 3.

In the embodiment described above, the sign bit decoder is used to receive three extended sign bits. However, it is also possible to use a decoder which is formed to receive extended sign bits of a given number. For example, in the case where a sign bit decoder for receiving two sign bits is used, the sum of the two sign bits becomes one of the following three cases:

$$0 + 0 = 0 \tag{9}$$

$$(-1) + 0 = (-1) \tag{10}$$

$$(-1) + (-1) = (-2) \tag{11}$$

Therefore, the entire sum of the sign bits can be obtained by decoding bits at any one digit in the sign bit portion. Examples of calculating the sum of the sign bit portions for four digits are shown in the following:

```
   0000        1111        1111
 + 0000      + 0000      + 1111
 ──────      ──────      ──────
   0000        1111        1110
             = (−1)      = (−2)
```

Since bits of the calculation result higher than the first bit are all equal, the decoder output can be expressed by two bits and the input thereto can be constituted by LSB of each sign bit portion.

Assume that the two input bits are A and B, the output LSB is S and the second bit is N. Under these circumstances it would only be necessary to satisfy the following relation between these bits.

$$S = A \oplus B \quad (12)$$
$$= (A \times \overline{B}) + (\overline{A} \times B)$$
$$N = A + B \quad (13)$$

FIG. 10 indicates the input-output relation of the sign bit decoder in the case where the sign bit is two bits. FIGS. 11 to 13 show concrete constructions of decoders which satisfy the input-output relation shown in FIG. 10.

The decoder shown in FIG. 11 is constituted by exclusive-OR gate 91 and OR gate 92. First and second input terminals of exclusive-OR gate 91 are connected to respectively receive sign bits A and B, and exclusive-OR gate 91 produces first bit output S. First and second input terminals of OR gate 92 are connected to respectively receive sign bits A and B, and OR gate 92 produces second bit output N.

The decoder shown FIG. 12 is constituted by NAND gates 93 to 96 and inverters 97 and 98. First and second input terminals of NAND gate 93 are connected to respectively receive sign bit A and output of inverter 97 which is connected to receive sign bit B. First and second input terminals of NAND gate 94 are connected to respectively receive sign bit B and output of inverter 98 which is connected to receive sign bit A. First and second input terminals of NAND gate 95 are connected to respectively receive outputs of NAND gates 93 and 94 and produce first bit output S. First and second input terminals of NAND gate 96 are connected to respectively receive outputs of inverters 97 and 98 and produce second bit output N.

The decoder shown in FIG. 13 is constituted by AND-NOR gate type composite gate 99, NOR gates 100 and 101 and inverter 102. First and second input terminals of AND gate 99-1 are connected to respectively receive sign bits A and B. Likewise, first and second input terminals of NOR gate 100 are connected to respectively receive sign bits A and B. Further, first and second input terminals of NOR gate 99-2 are connected to respectively receive outputs of AND gate 99-1 and NOR gate 100 and produce first bit output S. NOR gate 101 is connected to receive sign bits A and B at the first and second input terminals and supply an output to inverter 102 which in turn produces second bit output N.

When a sign bit decoder connected to receive 4-bit sign bit portion is used and if the 4-bit sign bit portions are regarded as binary numbers expressed in terms of 2's complement and added together, then the result of addition is one of 0, (−1), (−2), (−3) and (−4). Examples of addition of four digits are shown in the following:

```
   0000     1111     1111     1111     1111
   0000     0000     1111     1111     1111
   0000     0000     0000     1111     1111
 + 0000   + 0000   + 0000   + 0000   + 1111
 ──────   ──────   ──────   ──────   ──────
   0000     1111     1110     1101     1100
          = (−1)   = (−2)   = (−3)   = (−4)
```

Also, in this case, bits higher than the second bit in the result of addition are all equal, and therefore the decoder output can be expressed by 3 bits and an input therefor can be expressed by the LSB or a bit at any digit of the sign bit portion.

Assume that four input bits are A, B, C and D and the output bits are S, M and N. Then, it is only required to satisfy the following relation.

$$S = A \oplus B \oplus C \oplus D \quad (14)$$
$$= (A \times B \times C \times D) + (A \times B \times C \times D) +$$
$$M = (\overline{A} \times \overline{B} \times \overline{C} \times \overline{D}) + (\overline{A} \times B \times C \times D) + (A \times \overline{B} \times \overline{C} \times D) +$$
$$(\overline{C} \times D \times A) + B \overline{D} \times C \overline{A} \times \overline{D} \overline{B} + (A \times B \times C \times D) +$$
$$= (\overline{A} + \overline{B} + \overline{C} + \overline{D}) \times (A \times B \times C) \times (B \times C \times D) \times$$
$$(C \times D \times A) \times (D \times A \times B)$$
$$= (A \times B \times C) + (A \times B \times D) + (A \times C \times D) + \quad (15)$$
$$(B \times A \times C) + (B \times A \times D) + (\text{INAREA}$$

$$\times C \times \overline{D} \overline{C} + \overline{A} + B) \times (C \times A \times D) \times (C \times B \times D) +$$
$$(D \times A \times B) \times (D \times A \times C) + (D \times B \times C)$$

$$N = A + B + C + D \quad (16)$$

FIG. 14 indicates the input-output relation of the sign bit decoder in the case where the sign bit is four bits. FIGS. 15 and 16 show concrete constructions of decoders which satisfy the input-output relation shown in FIG. 14.

The decoder shown in FIG. 15 is constituted by exclusive-OR gates 111 to 113, NAND gates 114 to 119 and inverters 120 to 124. First and second input terminals of exclusive-OR gate 111 are connected to respectively receive sign bits A and B. First and second input terminals of exclusive-OR gate 112 are connected to respectively receive output of exclusive-OR gate 111 and sign bit C. First and second input terminals of exclusive-OR gate 113 are connected to respectively receive output of exclusive-OR gate 112 and sign bit D. Exclusive-OR gate 113 produces first bit output S. First to third input terminals of NAND gate 114 are connected to respectively receive sign bits A, B and C. First to third input terminals of NAND gate 115 are connected to respectively receive sign bits B, C and D. First to third input terminals of NAND gate 116 are connected to respectively receive sign bits C, D and A. First to third input terminals of NAND gate 117 are connected to respectively receive sign bits D, A and B. Inverters 120 to 123 are connected to receive sign bits A, B, C and D. First to fourth input terminals of NAND gate 118 are connected to respectively receive outputs of inverters 120 to 123. First to fifth input terminals of NAND gate 119 are connected to respectively receive outputs of NAND gates 114 to 118. Inverter 124 is connected to receive an output of NAND gate 119. Inverter 124 produces second bit output M, and NAND gate 118 produces third bit output N.

The decoder shown in FIG. 16 is constituted by exclusive-OR gates 131 to 133, NOR gates 134 to 139 and inverters 140 to 144. The circuit is basically the same as a circuit obtained by replacing the NAND gates of FIG. 15 by the NOR gates. First and second input terminals of exclusive-OR gate 131 are connected to respectively receive sign bits A and B. First and second input terminals of exclusive-OR gate 132 are connected to respectively receive output of exclusive-OR gate 131 and sign bit C. First and second input terminals of exclusive-OR gate 133 are connected to respectively receive output of exclusive-OR gate 132 and sign bit D. Exclusive-OR gate 133 produces first bit output S. Inverters 140 to 143 are connected to respectively receive sign bits A, B, C and D. First to fourth input terminals of NOR gate 134 are connected to respectively receive sign bits A, B, C and D. First to third input terminals of NOR gate 135 are connected to respectively receive outputs of inverters 140 to 142. First to third input terminals of NOR gate 136 are connected to respectively receive outputs of inverters 141 to 143. First to third input terminals of NOR gate 137 are connected to respectively receive outputs of inverters 142, 143 and 140. First to third input terminals of NOR gate 138 are connected to respectively receive outputs of inverters 143, 140 and 141. First to fifth input terminals of NOR gate 139 are connected to respectively receive outputs of NOR gates 134 to 138, and NOR gate 139 produces second bit output M. Inverter 144 is connected to receive an output of NOR gate 134 and produce third bit output N.

As described above, in the multiplier utilizing the second order Booth's algorithm, decoder means is used to decode the sign bits of the partial product and supply the total sum of the entire sign bits, and the decoded output is supplied to the partial product adding circuit. Therefore, the number of inputs of higher bits can be reduced, decreasing the number of the full adders of the partial product adding circuit. Thus, a parallel adder circuit which is simple in circuit construction can be provided.

What is claim is:

1. In a multiplier for determining the product of a multiplier and a multiplicand using Booth's algorithm and for producing a series of partial products in 2's complement format, each of the partial products containing a sign bit, a parallel adder circuit comprising:
    sign bit decoder means, connected to receive said sign bits of at least two of said partial products, for generating outputs; and
    partial product adding means, coupled to receive said partial products and the output of said sign bit decoder means, for producing the product of said multiplier and multiplicand, said partial product means including a plurality of bit adding means for producing different bits of said product, each of said bit adding means being coupled to receive corresponding bits of said partial products, and selected ones of said bit adding means being coupled to receive at least one of the outputs of said sign decoding means,
    wherein said sign bit decoder means is connected to receive two sign bits A and B and produce two single bit outputs S (=A⊕B) and N (=A+B).

2. A parallel adder circuit according to claim 1, wherein said sign bit decoder means includes first logic means for receiving two sign bits A and B to produce first bit output S (=A⊕B) and second logic means for receiving two sign bits A and B to produce second bit output N (=A+B).

3. A parallel adder circuit according to claim 1, wherein said sign bit decoder means includes an exclusive-OR gate connected to respectively receive sign bits A and B at first and second input terminals, and produce first bit output S, and an OR gate connected to respectively receive sign bits A and B at first and second input terminals, and produce second bit output N.

4. A parallel adder circuit according to claim 1, wherein said sign bit decoder means includes a first NAND gate connected to respectively receive sign bit A and an inverted signal of sign bit B at first and second input terminals, a second NAND gate connected to respectively receive an inverted signal of sign bit A and sign bit B at first and second input terminals, a third NAND gate connected to receive outputs of said first and second NAND gates, and produce first bit output S, and a fourth NAND gate connected to respectively receive inverted signals of sign bits A and B at first and second input terminals, and produce second bit output N.

5. A parallel adder circuit according to claim 1, wherein said sign bit decoder means includes an AND gate connected to respectively receive sign bits A and B at first and second input terminals, a first NOR gate connected to respectively receive sign bits A and B at first and second input terminals, a second NOR gate connected to receive outputs of said AND gate and first NOR gate, and produce first bit output S, a third NOR gate connected to respectively receive sign bits A and B at first and second input terminals, and an inverter connected to invert an output of said third NOR gate, and produce second bit output N.

6. In a multiplier for determining the product of a multiplier and a multiplicand using Booth's algorithm and for producing a series of partial products in 2's complement format, each of the partial products containing a sign bit, a parallel adder circuit comprising:

sign bit decoder means, connected to receive said sign bits of at least two of said partial products, for generating outputs: and partial product adding means, coupled to receive said partial products and the output of said sign bit decoder means, for producing the product of said multiplier and multiplicand, said partial product means including a plurality of bit adding means for producing different bits of said product, each of said bit adding means being coupled to receive corresponding bits of said partial products, and selected ones of said bit adding means being coupled to receive at least one of the outputs of said sign decoding means, wherein said sign bit decoder means is connected to receive three sign bits A, B and C, and produce three single bit outputs S ($=A \oplus B \oplus C$), M $[(=\overline{A} \times B)+(\overline{B} \times C)+\overline{C} \times A)]$ and N ($=A+B+C$).

7. A parallel adder circuit according to claim 6, wherein said sign bit decoder means includes first logic means for receiving three sign bits A, B and C to produce first bit output S ($=A \oplus B \oplus C$), second logic means for receiving three sign bits A, B and C to produce second bit output M $[=(\overline{A} \times B)+(\overline{B} \times C)+(\overline{C} \times A)$, and third logic means for receiving three sign bits A, B and C to produce third bit output N ($=A+B+C$).

8. A parallel adder circuit according to claim 7, wherein said sign bit decoder means includes a first exclusive-OR gate connected to respectively receive sign bits A and B at first and second input terminals, a second exclusive-OR gate connected to respectively receive output of said first exclusive-OR gate and sign bit C at first and second input terminals, and produce first bit output S, a first AND gate connected to respectively receive an inverted signal of sign bit A and sign bit B at first and second input terminals, a second AND gate connected to respectively receive an inverted signal of sign bits B and sign bit C at first and second input terminals, a third AND gate connected to respectively receive an inverted signal of sign bit C and sign bit A at first and second input terminals, a first OR gate connected to receive outputs of said first to third AND gates, and produce second bit output M, and a second OR gate connected to receive sign bits A, B and C, and produce third bit output N.

9. A parallel adder circuit according to claim 6, wherein said sign bit decoder means includes a first OR gate connected to respectively receive sign bits A and B at first and second input terminals, a first NAND gate connected to respectively receive sign bits A and B at first and second input terminals, a second NAND gate connected to receive outputs of said first OR gate and first NAND gate, a second OR gate connected to respectively receive an output of said second NAND gate and sign bit C at first and second input terminals, a third NAND gate connected to respectively receive an output of said second NAND gate and sign bit C at first and second input terminals, a fourth NAND gate connected to receive outputs of said second OR gate and third NAND gate, and produce first bit output S, a fifth NAND gate connected to respectively receive an inverted signal of sign bit A and sign bit B at first and second input terminals, a sixth NAND gate connected to respectively receive an inverted signal of sign bit B and sign bit C at first and second input terminals, a seventh NAND gate connected to respectively receive an inverted signal of sign bit C and sign bit A at first and second input terminals, an eighth NAND gate connected to receive outputs of said fifth to seventh NAND gates, and produce second bit output M, and a ninth NAND gate connected to respectively receive inverted signals of sign bits A, B and C at first to third input terminals, and produce third bit output N.

10. A parallel adder circuit according to claim 6, wherein said sign bit decoder means includes a first AND gate connected to respectively receive sign bits A and B at first and second input terminals, a first NOR gate connected to respectively receive sign bits A and B at first and second input terminals, a second NOR gate connected to respectively receive outputs of said first AND gate and first NOR gate at first and second input terminals, a second AND gate connected to respectively receive an output of said second NOR gate and sign bit C at first and second input terminals, a third NOR gate connected to respectively receive an output of said second NOR gate and sign bit C at first and second input terminals, a fourth NOR gate connected to receive outputs of said second AND gate and third NOR gate and produce first bit output S, a fifth NOR gate connected to respectively receive sign bit A and an inverted signal of sign bit B at first and second input terminals, a sixth NOR gate connected to respectively receive sign bit B and an inverted signal of sign bit C at first and second input terminals, a seventh NOR gate connected to respectively receive sign bit C and an inverted signal of sign bit A at first and second input terminals, an eighth NOR gate connected to receive outputs of said fifth to seventh NOR gates, a first inverter connected to invert an output of said eighth NOR gate, and produce second bit output M, a ninth NOR gate connected to respectively receive sign bits A, B and C at first to third input terminals, and a second inverter connected to invert an output of said ninth NOR gate, and produce third bit output N.

11. A parallel adder circuit according to claim 6, wherein said sign bit decoder means includes a first NAND gate connected to respectively receive an inverted signal of sign bit A, an inverted signal of sign bit B and sign bit C at first to third input terminals, a second NAND gate connected to respectively receive sign bit A, an inverted signal of sign bit B and an inverted signal of sign bit C at first to third input terminals, a third NAND gate connected to respectively receive an inverted signal of sign bit A, sign bit B and an inverted signal of sign bit C at first to third input terminals, a fourth NAND gate connected to respectively receive sign bits C, B and A at first to third input terminals, a fifth NAND gate connected to respectively receive inverted signals of sign bits C, B and A at first to third input terminals, and produce third bit output N, a sixth NAND gate connected to respectively receive outputs of said first to fourth NAND gates at first to fourth input terminals, and produce first bit output S, a seventh NAND gate connected to respectively receive outputs of said fourth and fifth NAND gates, at first and second input terminals, and an inverter connected to invert an output of said seventh NAND gate, and produce second bit output M.

12. In a multiplier for determining the product of a multiplier and a multiplicand using Booth's algorithm and for producing a series of partial in 2's complement format, each of the partial products containing a sing bit, a parallel adder circuit comprising:

sign bit decoder means, connected to receive said sign bits of at least two of said partial products, for generating outputs; and partial product adding means, coupled to receive said partial products and the output of said sign bit decoder means, for producing the product of said multiplier and multiplicand, said partial product means including a plurality of bit adding means for producing different bits of said product, each of said bit adding means being coupled to receive corresponding bits of said partial products, and selected ones of said bit adding means being coupled to receive at least one of the outputs of said sign decoding means, wherein said sign bit decoder means is connected to receive four sign bits A, B, C and D, and produce three single bit outputs S (=A⊕B⊕C⊕D), M [=(A×$\bar{B}$×$\bar{C}$)+(A×$\bar{B}$×$\bar{D}$) +(A×$\bar{C}$×$\bar{D}$)+(B×$\bar{A}$×$\bar{C}$)+(B×$\bar{A}$×$\bar{D}$)+(B×$\bar{C}$×$\bar{D}$)+(C×$\bar{A}$×$\bar{B}$)+(C×$\bar{A}$×$\bar{D}$)+(C×$\bar{B}$×$\bar{D}$)+(D×$\bar{A}$×$\bar{B}$)+(D×$\bar{A}$×$\bar{C}$)+(D×$\bar{B}$×$\bar{C}$)] and N (=A+B+C+D).

13. A parallel adder circuit according to claim 12, wherein said sign bit decoder means includes first logic means for receiving four sign bits A, B, C and D to produce first bit output S (=A⊕B⊕C⊕D), second logic means for receiving four sign bits A, B, C and D to produce second bit output M [=(A×$\bar{B}$×$\bar{C}$)+(A×$\bar{B}$×$\bar{D}$)+(A×$\bar{C}$×$\bar{D}$)+(B×$\bar{A}$×$\bar{C}$)+(B×$\bar{A}$×$\bar{D}$)+(B×$\bar{C}$×$\bar{D}$)+(C×$\bar{A}$×$\bar{B}$)+(C×$\bar{A}$×$\bar{D}$)+(D×$\bar{A}$×$\bar{B}$)+(D×$\bar{A}$×$\bar{C}$)+(D×$\bar{B}$×$\bar{C}$)], and third logic means for receiving four sign bits A, B, C and D to produce third bit output N (=A+B+C+D).

14. A parallel adder circuit according to claim 12, wherein said sign bit decoder includes a first exclusive-OR gate connected to respectively receive sign bits A and B at first and second input terminals, a second exclusive-OR gate connected to respectively receive an output of said first exclusive-OR gate and sign bit C at first and second input terminals, a third exclusive-OR gate connected to respectively receive an output of said second exclusive-OR gate and sign bit D at first and second input terminals, and produce first bit output S, a first NAND gate connected to respectively receive sign bits A, B and C at first to third input terminals, a second NAND gate connected to respectively receive sign bits B, C and D at first to third input terminals, a third NAND gate connected to respectively receive sign bits C, D and A at first to third input terminals, a fourth NAND gate connected to respectively receive sign bits D, A and B at first to third input terminals, a fifth NAND gate connected to respectively receive inverted signals of sign bits A, B, C and D at first to fourth input terminals, and produce third bit output N, a sixth NAND gate connected to respectively receive outputs of said first to fifth NAND gates at first to fifth input terminals, and an inverter connected to invert an output of said sixth NAND gate, and produce second bit output M.

15. A parallel adder circuit according to claim 13, wherein said sign bit decoder means includes a first exclusive-OR gate connected to respectively receive sign bits A and B at first and second input terminals, a second exclusive-OR gate connected to respectively receive an output of said first exclusive-OR gate and sign bit C at first and second input terminals, a third exclusive-OR gate connected to respectively receive an output of said second exclusive OR gate and sign bit D at first and second input terminals, a first NOR gate connected to respectively receive sign bits A, B, C and D at first to fourth input terminals, a second NOR gate connected to respectively receive inverted signals of sign bits A, B and C at first to third input terminals, a third NOR gate connected to respectively receive inverted signals of sign bits B, C and D at first to third input terminals, a fourth NOR gate connected to respectively receive inverted signals of sign bit C, D and A at first to third input terminals, a fifth NOR gate connected to respectively receive inverted signals of sign bits D, A and B at first to third input terminals, a sixth NOR gate connected to respectively receive outputs of said first to fifth NOR gates at first to fifth input terminals, and produce second bit output M, and an inverter connected to invert an output of said first NOR gate and produce third bit output N.

* * * * *